US006954535B1

(12) United States Patent
Arndt et al.

(10) Patent No.: US 6,954,535 B1
(45) Date of Patent: Oct. 11, 2005

(54) METHOD AND ADAPTING A HEARING AID, AND HEARING AID WITH A DIRECTIONAL MICROPHONE ARRANGEMENT FOR IMPLEMENTING THE METHOD

(75) Inventors: Georg-Erwin Arndt, Erlangen (DE); Hartmut Ritter, Neunkirchen (DE); Anton Gebert, Kleinsendelbach (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 960 days.

(21) Appl. No.: 09/594,393

(22) Filed: Jun. 15, 2000

(30) Foreign Application Priority Data

Jun. 15, 1999 (DE) ................................ 199 27 278

(51) Int. Cl.[7] ........................... H04R 29/00; G01S 3/80

(52) U.S. Cl. ........................ 381/60; 381/313; 381/315; 367/118

(58) Field of Search .......................... 381/313, 60, 315, 381/314

(56) References Cited

U.S. PATENT DOCUMENTS 5,375,174 A * 12/1994 Denenberg ................. 381/71.6
5,721,783 A * 2/1998 Anderson ................... 381/328
5,757,933 A * 5/1998 Preves et al. ............... 381/313
5,796,820 A * 8/1998 Sasada .................. 379/406.08
5,835,610 A * 11/1998 Ishige et al. ................ 381/315
5,852,668 A * 12/1998 Ishige et al. ................ 381/312
6,069,963 A * 5/2000 Martin et al. ............... 381/313
6,154,552 A * 11/2000 Koroljow et al. ........... 381/313
6,539,096 B1 * 3/2003 Sigwanz et al. ............ 381/313

FOREIGN PATENT DOCUMENTS

DE EP0778290 A1 * 2/1996 .......... H04R 25/00
EP 0 788 290 8/1997
EP 0 917 398 5/1999

* cited by examiner

*Primary Examiner*—Forester W. Isen
*Assistant Examiner*—Devona E. Faulk
(74) *Attorney, Agent, or Firm*—Schiff Hardin LLP

(57) ABSTRACT

In a method for adapting a hearing aid, and a hearing aid arrangement for improving the directivity of a hearing aid with a number of microphones that are connected to one another for generating a directional characteristic, the hearing aid is exposed to acoustic waves in a room for precision measuring while the user is wearing it, and the directional characteristic is registered. The filter parameters that arise therefrom are supplied to parameterizable filters in the hearing aid that are connected downstream from the microphones, and the desired ideal directional characteristic can be approximated taking the individual conditions into account when the hearing aid is worn.

9 Claims, 2 Drawing Sheets

METHOD AND ADAPTING A HEARING AID, AND HEARING AID WITH A DIRECTIONAL MICROPHONE ARRANGEMENT FOR IMPLEMENTING THE METHOD

BACKGROUND OF THE INVENTION

1. Field of the Invention

The present invention relates to a method for adapting a hearing aid and to a hearing aid arrangement operating according to the method.

2. Description of the Prior Art

Hearing aids with a directional microphone arrangement that is formed by at least two omnidirectional microphones are known as prior art, wherein differences in the signal transmission behavior of the utilized microphones are corrected by means of filters that are connected downstream of the microphone.

Further, it is known to adapt a hearing aid with directional microphones to a person wearing a hearing aid device with the aid of the artificial head "KEMAR" ("Knowles Electronics Manikin for Acoustical Research") that is based on the average anatomy of a user.

A disadvantage of these known hearing aids is that they often achieve an insufficient directivity.

SUMMARY OF THE INVENTION

An object of the present invention is to provide a method for improving the directivity of a hearing aid that is worn at the head as well as to provide a hearing aid arrangement to improve the directivity of a hearing aid.

The above object is achieved in accordance with the principles of the present invention in a method for adapting a hearing aid having a number of microphones which, in combination, produce a directional characteristic, and having respective filters connected downstream from the microphones which can be parameterized, as well as a signal processing stage and an earphone, and wherein the hearing aid is arranged at the head of a user and is exposed to acoustic waves from different directions, wherein the microphones convert the received acoustic signals into electrical signals which are supplied to an external measuring and evaluation unit, and wherein, in the measuring and evaluation unit, filter parameters are calculated from the electrical signals and are supplied to the hearing aid so as to parameterize the filters in terms of amplitude response and/or frequency response, to optimize the directional characteristic.

The directional characteristic of a hearing aid with a directional microphone can be determined by an appropriate measuring arrangement in a room for precision measuring. The position of the sound angles of incidence, at which the input signal is completely erased (erasure points), is the determining factor with respect to the thus-acquired directional diagrams. Different factors compete with an ideal directivity:

- microphones that are connected to one another for purposes of generating a directional characteristic differ in their frequency responses.
- external, individual conditions with respect to wearing the hearing aid have a negative effect on the desired directivity.

Whereas known methods only compensate the different transmission behavior of the utilized microphones and whereas the influence of a person wearing a hearing on the directional characteristic is only considered in the form of an artificial head that is adapted to the average anatomy of a user given the KEMAR method, the inventive method also takes individual conditions in connection with the person wearing the hearing device into consideration in order to improve the directivity. For example, individual conditions are the shape of the head, the size and physical nature of the external ear, the wearing position of the hearing aid device, the presence of eye glasses etc. The frequency responses of the signals received by the microphones that are disturbed by these conditions lead to the displacement of the erasure points, assure that there is only a limited damping of the input signal at these points instead of an erasure. The invention minimizes the differences regarding the transmission behavior of the microphones, minimizes the aforementioned parasitic inductions and improves the directivity of the hearing aid.

The adjustment of the directional characteristic and the tuning of the microphones ensues by means of an "in-situ-measuring", i.e. the user wears the hearing aid containing the microphones, and the signal curves in the signal paths of the microphones are tuned to one another.

Advantageously, the hearing aid that is arranged at the head of a person is sequentially exposed to acoustic waves from different directions for acquiring a directional diagram. A measuring and evaluation unit calculates filter parameters therefrom, from which an approximation of the measured directional characteristic ensues with respect to the desired directional characteristic.

The determination of appropriate filter parameters can ensue once or in an iterative method by repeatedly measuring, and taking the filter parameters acquired in the previous measurement into account. The hearing aid worn by the user can be successively exposed to acoustic waves from respectively different directions in a sequence, and the filter parameters calculated in the measuring and evaluation unit after the sequence. Alternatively, the hearing aid worn by the user can be exposed to acoustic waves from respectively different directions in a number of sequences, and the filter parameters calculated in the measuring and evaluation unit after each sequence, or after a prescribed number of the sequences.

In another version of the method, the hearing aid arranged at the head of the person is simultaneously exposed to acoustic waves from different directions (diffuse control panel) and the amplitude responses and/or phase responses of the incoming signals at various angles of incidence from the microphone are registered. Although this method, requires a higher calculating outlay, a shorter measuring time results for determination of the directional characteristic and the filter parameters.

The inventive hearing aid has filters in the signal paths of the microphones, and an amplitude response adaptation and/or phase response adaptation of the signals recorded by the microphones can be carried out by means of adjustable filter parameters. Preferably, the amplitude and phase responses can be adjusted separately from one another in these filters. For example, an FIR (Finite Impulse Response) filter exhibits this property.

In certain hearing aid devices with directional microphones, different directional characteristics can be selected by selecting different hearing programs, for example. Depending on the desired directional characteristic, the user-dependent parasitic inductions occur differently. In a further version of the invention, different sets of filter parameters are therefore acquired for eliminating the respective parasitic inductions in a hearing aid having a number of adjustable directional characteristics. These sets of filter parameters are stored in the hearing aid and are activated automatically by switching or by the user.

DESCRIPTION OF THE PREFERRED EMBODIMENTS

Figure 1:
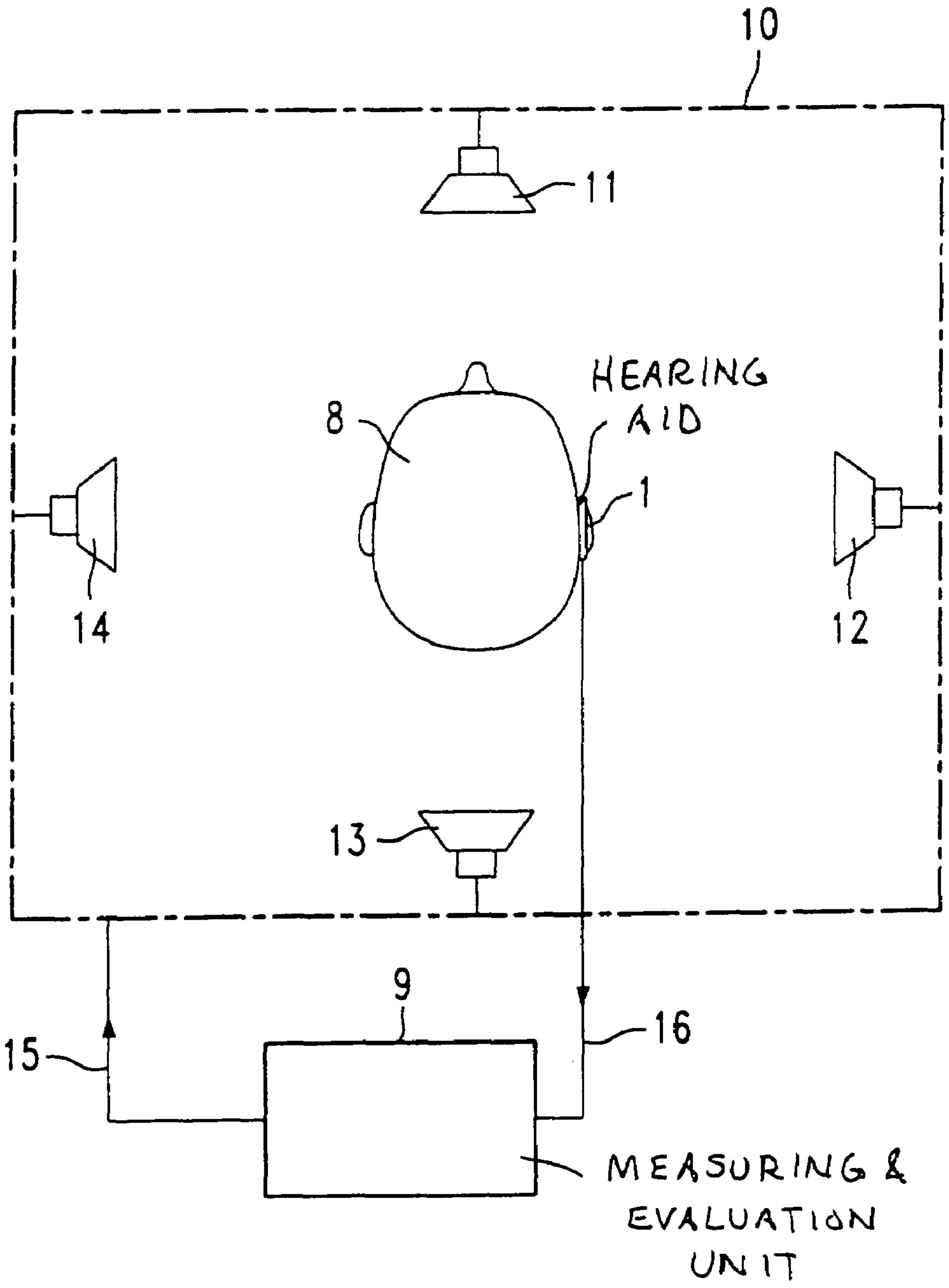
FIG. 1 shows a measuring and evaluation unit in an arrangement for adapting a hearing aid worn at the head of a person.

In the measuring and evaluation arrangement shown in FIG. 1, a hearing aid 1 worn at the head 8 of a person is situated in a room 10 for precision measuring (such as an anechoic chamber) for acoustic exposure from different directions with speakers 11, 12, 13 and 14 that can be individually driven and that can be modified with respect to their position to the hearing aid 1. An external measuring and evaluation unit 9, which is connected to the speakers via a signal path 15, controls the measurement. The sound signals recorded by the microphones 2, 3 of the hearing aid 1 are supplied via the signal path 16 of the external measuring and evaluation unit 9, which determines the directivity of the hearing aid device 1 dependent on the individual conditions. Normally, the measured directional diagram significantly differs from the desired ideal directional diagram. This is caused by a number of parasitic inductions, such as microphones that differ from one another with respect to their, frequency responses wearing position of the hearing aid at the head, size and physical nature of the external ear, wearing eyeglasses etc. The measuring and evaluation unit 9 calculates filter parameters from the registered directional diagram. These filter parameters, via the signal path 16, can be transferred to filters 4, 5 that can be parameterized and that are connected downstream with respect to the microphones 2, 3 of the hearing aid 1. The directional characteristic of the hearing aid device 1 that is adapted to the individual conditions in this way is now in better accordance with the desired ideal directional characteristic. A further approximation with respect to the ideal directional characteristic can be achieved by repeating this process, possibly by including the filter parameters acquired in the previous step and the thus-modified directional characteristic.

Figure 2:
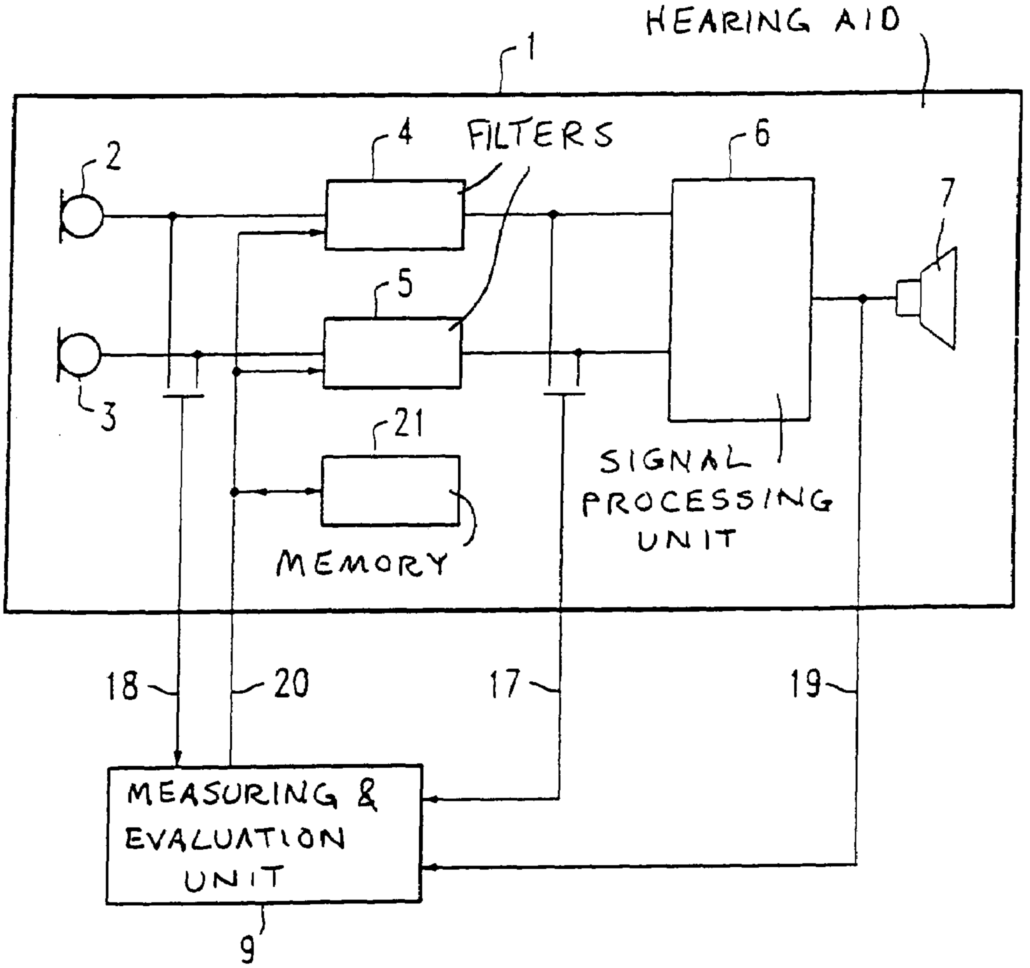
FIG. 2 is a block diagram of a hearing aid arrangement constructed and operating in accordance with the invention, with a hearing aid having microphones for generating a directional characteristic in connection with a measuring and evaluation unit of the type shown in FIG. 1.

In the inventive hearing aid arrangement shown in FIG. 2, the hearing aid 1 contains two microphones 2, 3 that are connected to one another (in a known way that is not shown) for generating a directional characteristic. Filters 4, 5 that can be parameterized are situated in the signal paths of the microphones 2, 3. The amplitude and phase responses of these filters 4, 5 can be adjusted independently of one another. For example, an FIR filter exhibits this property. The sound signals recorded by the microphones 2, 3 are supplied to a signal processing unit 6 for generating the directional characteristic and for the further processing and are finally emitted via an earphone 7. For calculating the filter parameters, the signals picked up by the microphones 2, 3, are tapped in the signal paths of the microphones 2,3, preferably after the parameterizable filters 4 and 5, and are supplied to the measuring and evaluation unit 9 via a signal path 17. In addition, the signals at the outputs of the microphones 2, 3 and at the input of the earphone 7, via two signal paths 18 and 19, are utilized for calculating the filter parameters in the exemplary embodiment. The frequency responses of the signals in the individual signal paths can be tuned to one another and, for example, the position of the sound angles of incidence, at which a signal erasure ensues and which critically determine the directivity, can be adjusted by means of the filter parameters. The disturbing influence due to nonidentical microphones, the wearing position of the hearing aid 1 at the head, the size and physical nature of the external ear, etc. are minimized as a result thereof. The transmission of the filter parameters to the hearing aid 1 ensues via a signal path either directly by means of the measuring and evaluation unit 9 or by means of an external programming device (not shown). Moreover, the filter parameters can be stored in an internal storage unit 21 of the hearing aid 1 in the exemplary embodiment. Therefore, a number f sets of filter parameters, for different directional characteristics, can be stored and can be activated if required, for example, for adapting to different hearing situations.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for adapting a hearing aid to user-dependent conditions, comprising the steps of:

providing a hearing aid device to be worn at an ear of a user, having a microphone arrangement with a directional characteristic comprising a plurality of microphones with filters respectively connected downstream therefrom, and filters being parameterizable in terms of amplitude response and phase response, and a signal processing stage and an earphone;

while said user is wearing said hearing aid, exposing said hearing aid to acoustic waves from different directions to produce incoming acoustic signals to said microphones, said microphones converting said incoming acoustic signals into electrical signals;

providing a measuring and evaluation unit externally from said hearing aid and supplying said electrical signals from said hearing aid to said external measuring and evaluation unit;

in said measuring and evaluation unit, calculating filter parameters from said electrical signals that conform said directional characteristic to a predetermined, desired directional characteristic; and supplying said filter parameters from said measuring and evaluation unit to said filters in said hearing aid for setting at least one of said amplitude response and said phase response in each of said filters.

2. A method as claimed in claim 1 wherein the step of exposing said hearing aid to acoustic waves from different directions comprises successively exposing said hearing aid to acoustic waves from respectively different directions in a sequence, and wherein the step of calculating said filter parameters comprises calculating said filter parameters in said measuring and evaluation unit after said sequence.

3. A method as claimed in claim 1 wherein the step of exposing said hearing aid to acoustic waves from different directions comprises successively exposing said hearing aid to acoustic waves from respectively different directions in a plurality of sequences, and wherein the step of calculating said filter parameters comprises calculating said filter parameters in said measuring and evaluation unit after each sequence.

4. A method as claimed in claim 1 wherein the step of exposing said hearing aid to acoustic waves from different directions comprises successively exposing said hearing aid to acoustic waves from respectively different directions in a plurality of sequences, and wherein the step of calculating said filter parameters comprises calculating said filter parameters in said measuring and evaluation unit after a prescribed number of said sequences.

5. A method as claimed in claim 1 wherein the step of exposing said hearing aid to acoustic waves from different directions comprises simultaneously exposing said hearing aid to acoustic waves from said different directions.

6. A hearing aid arrangement comprising:

a hearing aid having a directional characteristic, with a plurality of microphones and respective filters connected downstream from said microphones, a signal processor and an earphone, said filters being parameterizable with regard to amplitude response and phase response with said amplitude response and said phase response being independently adjustable; and a measuring and evaluation unit disposed externally from said hearing aid and in communication at least with outputs from said microphones in said hearing aid and with said filters in said hearing aid, said measuring and evaluation unit receiving electrical signals from said microphones corresponding to acoustic signals received from different directions by said microphones while said hearing aid is being worn by a user, and said evaluation and measuring unit calculating filter parameters from said electrical signals and supplying said filter parameters to said filters in said hearing aid for adjusting at least one of said amplitude response and said phase response of said filters and conforming said directional characteristic to a predetermined, desired directional characteristic.

7. A hearing aid arrangement as claimed in claim 6 wherein each of said filters is an FIR filter.

8. A hearing aid arrangement as claimed in claim 6 comprising:

a hearing aid having a directional characteristic, with a plurality of microphones and respective filters connected downstream from said microphones, a signal processor and an earphone, said filters being parameterizable with regard to amplitude response and phase response;

a measuring and evaluation unit disposed externally from said hearing aid and in communication at least with outputs from said microphones in said hearing aid and with said filters in said hearing aid, said measuring and evaluation unit receiving electrical signals from said microphones corresponding to acoustic signals received from different directions by said microphones while said hearing aid is being worn by a user, and said evaluation and measuring unit calculating filter parameters from said electrical signals and supplying said filter parameters to said filters in said hearing aid for adjusting at least one of said amplitude response and said phase response of said filters and optimizing said directional characteristic with respect to a predetermined, desired directional characteristic; and a memory in which a plurality of different sets of filter parameters, calculated in said measuring and evaluation unit and supplied to said memory, are stored.

9. A hearing aid arrangement as claimed in claim 8 wherein said measuring and evaluation unit calculates said different sets of filter parameters respectively for different directional characteristics.

* * * * *